US008557075B2

(12) United States Patent
Gelli et al.

(10) Patent No.: US 8,557,075 B2
(45) Date of Patent: Oct. 15, 2013

(54) METHOD AND DEVICE FOR JOINING PLIES OF PAPER

(75) Inventors: Mauro Gelli, Lucca (IT); Romano Maddaleni, Pisa (IT); Valter Di Nardo, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 935 days.

(21) Appl. No.: 11/885,443

(22) PCT Filed: Feb. 27, 2006

(86) PCT No.: PCT/IT2006/000113
§ 371 (c)(1), (2), (4) Date: Aug. 31, 2007

(87) PCT Pub. No.: WO2006/092818
PCT Pub. Date: Sep. 8, 2006

(65) Prior Publication Data
US 2008/0236773 A1 Oct. 2, 2008

(30) Foreign Application Priority Data
Mar. 1, 2005 (IT) ................................ FI2005A0032

(51) Int. Cl.
*B29C 59/04* (2006.01)

(52) U.S. Cl.
USPC .......................................................... 156/209

(58) Field of Classification Search
None
See application file for complete search history.

(56) References Cited

U.S. PATENT DOCUMENTS

| | | | | |
|---|---|---|---|---|
| D182,036 | S * | 2/1958 | Muller | D5/53 |
| D184,954 | S * | 4/1959 | Muller | D5/53 |
| 3,694,300 | A | 9/1972 | Small | |
| 4,320,162 | A | 3/1982 | Schulz | |
| 4,978,565 | A | 12/1990 | Pigneul et al. | |
| 5,433,817 | A | 7/1995 | Biagiotti | |
| 5,622,734 | A | 4/1997 | Clark et al. | |
| 5,686,168 | A | 11/1997 | Laurent et al. | |
| 5,698,291 | A | 12/1997 | Clark et al. | |
| 5,846,636 | A | 12/1998 | Ruppel et al. | |
| D429,074 | S * | 8/2000 | Hurst et al. | D5/53 |
| 6,572,722 | B1 * | 6/2003 | Pratt | 156/209 |
| 6,863,107 | B2 * | 3/2005 | Hein et al. | 156/470 |
| 2003/0131919 | A1 | 7/2003 | King et al. | |
| 2006/0103715 | A1 * | 5/2006 | Haimberger et al. | 347/197 |
| 2007/0084543 | A1 * | 4/2007 | Schmidt | 156/205 |

FOREIGN PATENT DOCUMENTS

| | | | |
|---|---|---|---|
| DE | 196 54 249 | A1 | 6/1998 |
| EP | 0 408 248 | A2 | 1/1991 |
| EP | 0 570 578 | B1 | 9/1995 |
| EP | 0 370 972 | B2 | 3/1998 |
| EP | 1 096 069 | A2 | 5/2001 |
| EP | 1 054 764 | B1 | 7/2002 |
| EP | 1 096 069 | A3 | 8/2002 |
| EP | 1 075 387 | B1 | 11/2003 |
| IT | 1213847 | | 1/1990 |
| IT | 01259434 | | 3/1996 |
| IT | 01259666 | | 3/1996 |
| IT | 01304880 | | 4/2001 |
| WO | WO 01/38078 | A1 | 5/2001 |

* cited by examiner

*Primary Examiner* — Barbara J Musser
(74) *Attorney, Agent, or Firm* — Breiner & Breiner, L.L.C.

(57) ABSTRACT

The device for joining at least two plies of paper (V1, V2), in particular tissue paper, comprises a ply-bonding unit (9) and moistening means (11) to moisten at least one of said two plies before joining.

10 Claims, 1 Drawing Sheet

METHOD AND DEVICE FOR JOINING PLIES OF PAPER

TECHNICAL FIELD

The present invention relates to a method and a device for joining plies of paper, in particular tissue paper, i.e. the paper typically used to produce toilet paper, kitchen towels, paper handkerchiefs or the like.

STATE OF THE ART

In the production of toilet paper, but also of other articles such as kitchen towels, paper handkerchiefs and napkins or the like, two or more plies of tissue paper are normally used, joined together with different techniques. A first and more widely used method of reciprocal joining or bonding of two plies involves the use of glues. At least one of the two plies is embossed, by feeding it between an embossing roller provided with protuberances, and a counter-roller which can have recesses corresponding to the protuberances of the embossing roller or, more frequently, a smooth and yielding surface made of rubber or the like. The pressure with which the counter-roller or pressure roller is pressed against the embossing roller causes deformation of the yielding coating. The ply of paper positioned in the nip between the two rollers is thus deformed permanently with at least partial breakage of the fibers of which it is composed. Protuberances or projections are produced in the ply at the level of the protuberances on the embossing roller. A glue is applied to the tips of some or all of the projections of the ply. Subsequently, the glued ply is laminated together with another ply, optionally also embossed.

Examples of embossing machines and devices which join plies of paper by gluing are described in EP-A-1,075,387, EP-A-0,765,215; EP-A-408,248; U.S. Pat. No. 4,320,162; U.S. Pat. No. 5,686,168; EP-A-1,054,764; U.S. Pat. No. 4,978,565; U.S. Pat. No. 3,694,300; FR-A-2,684,598; EP-A-0,370,972.

The technique to join plies by gluing is widely used but not devoid of drawbacks. In the first place, glue is an expendable product that has a considerable influence on the cost of the finished product. Moreover, the nature of the material to which the glue is applied causes it to seep through the cellulose fibers forming the plies of paper, and consequently slow but constant deposit of glue residues on the mechanical parts. This results in the need for periodic cleaning operations.

Moreover, the glue has a negative effect on the final properties of the product, in particular on its softness and absorption capacities. High quantities of glue can also have a negative effect on the cutting steps of the paper material.

According to a different technique, two plies of tissue paper are joined together by exerting a strong pressure thereon. This technique is called ply-bonding. The plies are fed between a roller, usually smooth, and a counter-roller or a series of wheels, provided with small projections or knurls. The localized pressure exerted between the knurled surface of the counter-roller or wheels and the smooth surface of the roller causes local bonding of the fibers of the plies.

An example of a ply-bonding machine is described in U.S. Pat. No. 5,433,817.

IT-B-1,304,880 describes an embossing device in which the plies are joined either by glue applied to the protuberances of an embossed ply or by ply-bonding, with a ply-bonding roller that cooperates with the embossing roller. The two joining methods are indicated as alternatives and not combined.

IT-B-1,259,666 describes an embossing unit in which plies are joined by simple ply-bonding.

IT-B-1,259,434 describes a device in which ply-bonding is performed on the entire surface of the plies, rather than in localized areas, to obtain an improved aesthetic effect. IT-B-1,213,847 describes a device in which plies of paper are subjected to ply-bonding according to a helical pattern.

The advantage of ply-bonding is that glue can be eliminated in the finished product, thereby avoiding the aforesaid drawbacks relative to the use of glue. However, this joining technique cannot always be used and in any case has a series of limitations. In fact, the bond between plies joined by ply-bonding is entrusted to a localized bonding effect of the fibers of the two plies, only obtainable with extremely high pressures. This entails high mechanical stresses on the members of the ply-bonding unit. Moreover, due to the need to reach extremely high localized pressures, and to the limits of mechanical strength of the machine members, the incisions or knurls with which the ply-bonding rollers or wheels are provided cannot be chosen at will, but must comply with specific dimensioning criteria, which firstly require limitation of the reciprocal contact surface, to increase the pressure given the same overall force applied by the ply-bonding unit.

These characteristics of the ply-bonding technique have a negative effect on the aesthetic qualities of the finished product and limit its use to only a few applications.

OBJECTS AND SUMMARY OF THE INVENTION

The object of the present invention is to produce a method of bonding, i.e. of joining plies of paper, especially tissue paper or similar paper with low grammage and high porosity, which overcomes or reduces the drawbacks of the aforesaid bonding techniques.

According to a different aspect, the object of the present invention is to produce a device that performs joining or bonding of plies of paper, in particular tissue paper or similar paper, which overcomes entirely or in part the drawbacks of ply-bonding units and embossing and laminating units employing a glue to join the plies.

These and other objects and advantages which will appear clear to those skilled in the art from reading the text hereunder, are obtained in substance with a method for joining plies of paper, especially tissue paper, in which at least a first and a second ply of paper are joined by applying localized pressure, i.e. by ply-bonding, characterized in that at least one of the plies is moistened in the areas on which said localized pressure is exerted.

Moistening locally weakens the fibers of the ply and reduces reciprocal adhesion between fibers of the same ply, so that bonding of two plies pressed together by ply-bonding members is facilitated. In substance, the moistening agent favors joining of the plies by ply-bonding, also favoring the formation of chemical bonds between fibers of the two plies ply-bonded together.

This makes it possible to utilize lower ply-bonding pressures with respect to those normally employed. This can lead to a reduction in the total mechanical stresses applied to the mechanical members. Moreover, as the plies can be joined even with lower local pressure values, given the same overall stress applied, greater freedom can be attained in implementing the engraving patterns of the rollers that cause ply-bonding. For example, using an engraved roller as an embossing roller and a ply-bonding counter-roller or pressure roller, or a series of ply-bonding or pressure wheels, the engravings can even have relatively wide front surfaces, as it is no longer necessary to concentrate the compression forces in very small areas to obtain the ply-bonding pressures normally required to attain joining by bonding of the fibers of the plies.

Although it is possible to moisten the entire ply evenly, or even both the plies to be joined, according to a preferred embodiment of the invention, at least one of said plies is moistened on only a portion of its total surface. For example, and advantageously, a percentage equal to or lower than 25% of the total surface of said at least one ply can be moistened. The moistened area can correspond to or comprise the surface on which the ply-bonding pressure is applied. In this way, by keeping large areas of the surface of the ply unmoistened, excessive weakening of the ply is prevented, which can have negative consequences during subsequent processing operations, such as rewinding and cutting, or also printing. On the other hand, as moistening has the function of facilitating localized bonding of the fibers, it is not necessary for said moistening to involve the surface areas of the ply not subject to ply-bonding.

For example, ply-bonding can be implemented by pressure or ply-bonding wheels aligned with one another axially (or even not aligned), but spaced apart. In this case moistening of the ply or plies can be limited to longitudinal strips corresponding to the strips on which the wheels act, leaving the ply substantially dry in the adjacent bands.

Moreover, by ply-bonding the plies at the level of the protuberances of a roller cooperating, for example, with a counter-roller or a series of smooth or knurled ply-bonding wheels, the moistening agent can be applied only or principally to the protuberances, or to some of these protuberances.

For example, according to a possible embodiment of the method according to the invention, at least one of the two plies can be embossed before joining said two plies by said localized pressure. In this case, ply-bonding can be implemented utilizing the embossing roller as one of the two cooperating members of the ply-bonding unit. In this case, the protuberances (or at least some of the protuberances) produced on said embossed ply can be moistened, leaving the surrounding area dry. If the surface deformed by embossing of the ply is equal, for example, to 20% of the total surface, this means that the wetted or moistened area of the ply is very small. Besides not excessively influencing the mechanical strength of the ply, this allows rapid drying of the ply before it is subjected to further processing that might require greater mechanical strength, such as rewinding.

In a particularly advantageous embodiment of the invention, the method provides for the steps of: embossing at least a first of the plies to be bonded, using an embossing roller provided with protuberances and a pressure roller cooperating with the embossing roller; and feeding the second ply between the embossing roller and at least one ply-bonding roller; bonding by localized pressure of the two plies being obtained in the nip between said embossing roller and said ply-bonding roller. In this case at least some of the protuberances of the embossed ply can be moistened when this is still engaged with the embossing roller, in a position along said embossing roller, between the pressure roller and the ply-bonding roller.

Moistening of the ply or of both plies to be bonded can take place preferably with a liquid devoid of glues, i.e. of adhesive materials. For example, the liquid can simply be water. In this way, any seepage of the liquid through the structure of the cellulose fibers forming the ply does not cause glue to be left on the surfaces of the mechanical members of the device, such as the embossing roller, simplifying management of the systems, reducing maintenance costs, increasing productivity and quality of the finished product.

The liquid utilized to moisten or dampen the ply or plies can be colored, for example an ink or water colored with a diluted ink. This allows the liquid to be utilized not only to facilitate and improve ply-bonding, but also to obtain chromatic patterns. The possibility offered by the new joining technique through ply-bonding moistened plies allows greater freedom in choosing the embossing pattern on which ply-bonding is performed, and this allows full use of the advantages deriving from the use of a colored liquid, as prestigious raised and colored decorative patterns can be obtained. Different liquids with different colors, applied, for example, by multiple applicators could also be provided, to make a multicolor pattern.

The technique proposed by the present invention is particularly useful and advantageous in the processing of tissue paper plies with a grammage ranging from 10 to 35 $g/m^2$ and preferably between 12 and 30 $g/m^2$ for each ply.

It has been found that by utilizing moistening of the ply or of both plies to be bonded, the localized pressure required for ply-bonding can be attained applying a force per unit of length ranging from 15 to 60 kg/linear cm.

According to a different aspect, the invention relates to a device for joining at least two plies of paper, in particular tissue paper, comprising a ply-bonding unit, characterized by moistening means to moisten at least one of said two plies before joining.

The moistening means can be produced and positioned in various ways. Preferably, the moistening means are positioned upstream of the ply-bonding members, although it would also be possible to position them at the level of said ply-bonding members, for example by providing a reservoir inside which, for example, one of the ply-bonding members is constantly wetted with moistening liquid, typically water. Alternatively, roller or spray applicators or the like can be used. In any case the moistening means can apply liquid in longitudinal strips or areas.

Preferably, in an advantageous embodiment, the device comprises in combination: an embossing roller; a pressure roller cooperating with the embossing roller and defining therewith an embossing nip; a first feed path for a first ply towards the embossing nip; a ply-bonding roller, cooperating with the embossing roller, positioned downstream of the pressure roller and defining a ply-bonding nip; a second feed path for a second ply towards the ply-bonding nip. In this case, it is advantageous for the moistening means to be associated with said embossing roller and to apply a liquid to the protuberances of the first ply, downstream of the embossing nip.

Further advantageous characteristics and embodiments of the invention are indicated in the appended claims and will be described hereunder in greater detail.

BRIEF DESCRIPTION OF THE DRAWINGS

The invention will be better understood by following the description and accompanying drawing, which shows a non-limiting practical embodiment of the invention. More specifically, in the drawing.

DETAILED DESCRIPTION OF AN EMBODIMENT OF THE INVENTION

Figure 1:
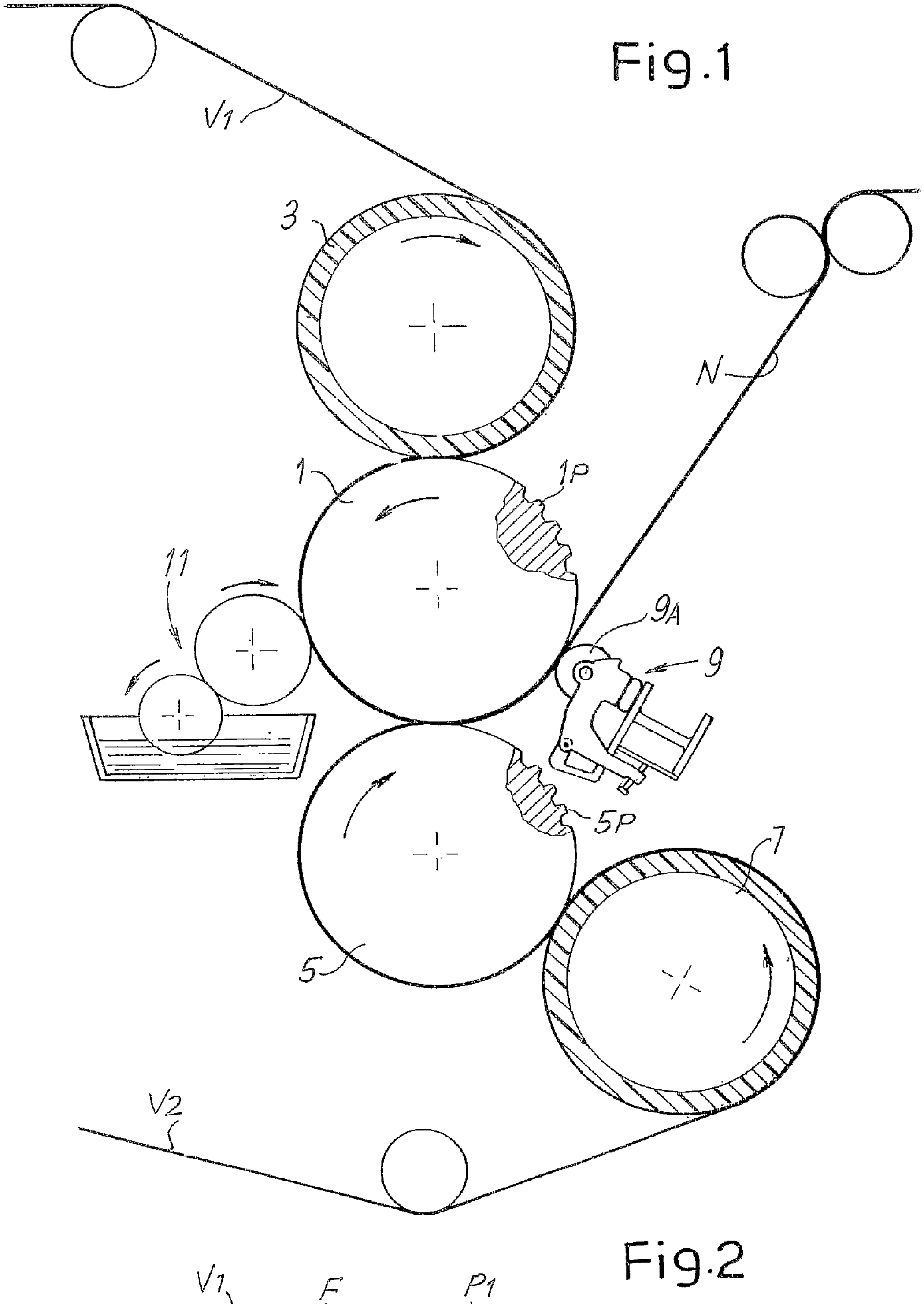
FIG. 1 shows a schematic side view of a device according to the invention.

FIG. 1 schematically shows a device implementing the invention. It comprises a first embossing roller 1 cooperating with a first pressure roller 3, coated in rubber or another resiliently yielding material. An embossing nip is defined between the two rollers 1 and 3, through which a first ply V1 of web material, typically tissue paper, is fed.

The embossing roller 1 is provided with protuberances 1P, which can be simple protuberances with a repetitive geometrical shape, such as truncated pyramids or truncated cones, or protuberances with a more complex shape, as known to those skilled in the art. The rollers 1 and 3 are pressed against each other, so that the ply V1 fed therethrough is permanently deformed, and protuberances P1 (FIG. 2) are formed thereon at the level of the projections or protuberances 1P of the embossing roller 1.

The device also comprises a second embossing roller 5, positioned in this example of embodiment at a certain distance from the roller 1, and cooperating with a second pressure roller 7, also coated with rubber or another yielding material. Similarly to the pair of rollers 1, 3, the pair of rollers 5, 7 are also used to emboss a second ply V2, fed into the embossing nip formed between the rollers 5, 7 along a second feed path of the ply.

The ply V2 embossed by the embossing unit 5, 7 is detached from the second embossing roller 5 and placed over the ply V1, which is engaged with the surface of the embossing roller 1. A ply-bonding device, generically indicated with 9, is positioned downstream of the area in which the second ply V2 comes into contact with the ply VI engaged with the embossing roller 1. This is represented, in the example shown, as a group of ply-bonding wheels with relative plenum chambers, produced in the same way as described, for example, in U.S. Pat. No. 5,433,817. The ply-bonding wheels 9A are aligned with one another, in the example shown, along a common axis of rotation and are pressed against the surface of the embossing roller 1, in order to laminate and press the plies V1 and V2 against each other at high pressure, in pressure areas limited to the front surface of the protuberances 1P with which the embossing roller 1 is provided.

A moistening device 11, composed in the example shown of an applicator similar to an inking device or a gluing device, with an applicator roller 11A, is positioned between the pressure roller 3 and the second embossing roller 5, along the circumferential extension of the embossing roller 1. Contrary to what occurs in conventional embossing and laminating devices, the applicator 11 does not apply a glue or adhesive, but a liquid devoid of glue, for example and preferably water, optionally with the addition of an ink or other colorant. The applicator roller 11A can be a smooth roller or a cliche roller, to apply the liquid evenly to all the protuberances P1 formed on the ply V1 by the embossing roller 1, or to only a few of these. For example, and in particular in the case shown, if the ply-bonding unit 9 has individual ply-bonding wheels 9A, the applicator roller 11A can have raised annular bands, in positions corresponding to the wheels 9A, so that the ply V1 is moistened only in the corresponding longitudinal areas. Alternatively, if for example the wheels 9A are replaced by a continuous roller, the applicator roller 11A can also be continuous.

To reduce the surface of the ply V1 subjected to ply-bonding, for example to increase the local pressure exerted by the ply-bonding wheels 9A, the protuberances 1P of the embossing roller 1 can be of different heights. In this case, all the protuberances will produce embossing, but the ply V1 will only be wetted and subjected to ply-bonding pressure at the level of the highest ones.

The two plies V1, V2 are bonded with substantially lower pressures than those normally utilized in ply-bonding, thanks to the fact that the water or other moistening liquid applied by the dispensing unit 11 facilitates localized bonding of the fibers of the two plies, in the points in which pressure is exerted by the ply-bonding unit 9.

Figure 2:
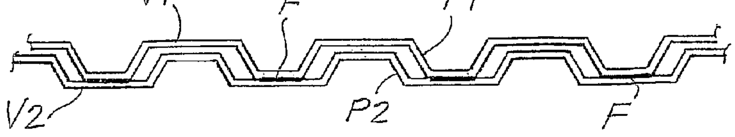
FIG. 2 shows a schematic and greatly enlarged cross section of a web material obtained by joining two embossed plies.

The protuberances P2 produced by embossing on the ply V2 due to the protuberances 5P provided on the second embossing roller 5, are nested between the protuberances P1 of the ply V1, as shown in the schematic cross section in FIG. 2. The areas F are the areas in which the two plies are bonded by ply-bonding.

Numerous variants to the device illustrated are possible. For example, rather than being embossed, the second ply could be fed smooth into the nip between the roller 1 and the ply-bonding unit 9. In other embodiments, one or other or both of the plies V1 and V2 could be subjected to preliminary background micro-embossing, to printing or to other procedures to modify the aesthetic, technical and/or functional characteristics.

The plies V1 and V2 could also in turn be formed of two or more plies, joined according to a known technique. For example, if two superimposed plies are fed into the embossing nip between the rollers 1 and 3 or 5 and 7, these will be joined reciprocally due to this embossing.

It is understood that the drawing only shows a practical embodiment of the invention, which may vary in forms and arrangements, without however departing from the scope of the concept on which the invention is based. Any reference numerals in the appended claims are provided purely to facilitate the reading thereof, in the light of the above description and accompanying drawings, and do not in any way limit the scope of protection.

The invention claimed is:

1. Method for joining plies of paper comprising steps of embossing a first ply by an embossing roller provided with protuberances and a pressure roller cooperating with said embossing roller; feeding said first ply and a second ply according to a longitudinal direction of advancement through a ply-bonding nip between the embossing roller and a set of ply-bonding wheels, said ply-bonding wheels being separated and spaced apart from one another in a cross-machine direction transverse to said direction of advancement so as to provide (1) first areas which can receive localized pressure from said ply-bonding wheels and (2) second areas between respective ones of said ply-bonding wheels which do not receive pressure from said ply-bonding wheels, when said ply-bonding wheels are positioned to exert localized pressure on said embossing roller; bonding said first ply and said second ply together by localized pressure in said ply-bonding nip; wherein at least one of said first ply and said second ply is moistened only in said first areas in which said localized pressure is to be exerted along longitudinal areas separate and in a spaced relation from one another in said cross-machine direction and extending parallel to an advancement direction of said first ply and said second ply, and wherein on said longitudinal areas following moistening thereof, said localized pressure is exerted on said first areas by said ply-bonding wheels so that said first ply and said second ply are bonded by moisture in said longitudinal areas which have been moistened and by said localized pressure in absence of any adhesive material.

2. The method as claimed in claim 1, wherein said longitudinal areas are equal to or less than 25% of the total surface of said at least one of said first ply and said second ply.

3. The method as claimed in claim 1, wherein said at least one of said first ply and said second ply is moistened with water.

4. The method as claimed in claim 1, wherein said at least one of said first ply and said second ply is moistened with a colored liquid.

5. The method as claimed in claim 1, wherein at least one of said first ply and said second ply is embossed before joining said first ply and said second ply by said localized pressure.

6. The method as claimed in claim 5, wherein at least some protuberances produced on said at least one of said first ply and said second ply when embossed are moistened.

7. The method as claimed in claim 1, wherein at least some protuberances provided in the first ply during said embossing engaged with the embossing roller are moistened between the pressure roller and the set of ply-bonding wheels.

8. The method as claimed in claim 1, wherein said first ply and said second ply are tissue paper having a grammage ranging from 10 to 35 $g/m^2$ per ply.

9. The method as claimed in claim 1, wherein said localized pressure is produced applying a force per unit of length ranging from 15 to 60 kg/cm.

10. The method as claimed in claim 1 further comprising feeding said first ply around said embossing roller; embossing said first ply between said embossing roller and said pressure roller, producing protuberances on said first ply, at a level of protuberances on the embossing roller; while the first ply is engaged with the protuberances of the embossing roller, moistening by a liquid applicator, said first ply at the level of at least some of said protuberances; pressing the second ply against the first ply at a level of at least some of the protuberances, to obtain joining of the first ply and the second ply by said localized pressure.

* * * * *